US012329723B1

(12) United States Patent
Anyomi

(10) Patent No.: US 12,329,723 B1
(45) Date of Patent: *Jun. 17, 2025

(54) ACCESS COUNTING LID FOR A PRESCRIPTION PILL BOTTLE

(71) Applicant: Felix Mawuli Anyomi, Tulsa, OK (US)

(72) Inventor: Felix Mawuli Anyomi, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,771

(22) Filed: Nov. 20, 2023

Related U.S. Application Data

(63) Continuation of application No. 17/541,573, filed on Dec. 3, 2021, now Pat. No. 11,819,473.

(51) Int. Cl.
*A61J 7/04* (2006.01)
*A61J 1/03* (2023.01)

(52) U.S. Cl.
CPC ............... *A61J 7/0427* (2015.05); *A61J 1/03* (2013.01)

(58) Field of Classification Search
CPC .... A61J 7/04; A61J 1/03; A61J 7/0076; A61J 1/1412; A61J 7/0436; A61J 7/0454; A61J 7/0481; B65D 2583/0409; B65D 83/0038; B65D 51/245; B65D 2583/0422; B65D 2215/00; B65D 47/0861; G06M 1/043; G06M 1/041; A61M 15/0068; A61M 15/007; A61M 15/0073; A61M 15/0075
USPC .......... 215/365, 230, 11.1; 206/459.1, 459.5, 206/534, 533, 531; 221/4; 222/638, 23, 222/30; 128/205.23; 235/103
See application file for complete search history.

(56) References Cited

U.S. PATENT DOCUMENTS 3,151,599 A * 10/1964 Livingston ................ A61J 7/04 206/536
3,205,863 A * 9/1965 Rhoades .............. B43K 24/084 401/111
3,393,795 A * 7/1968 Covert, Jr. ......... B65D 83/0454 206/533
3,901,407 A * 8/1975 Mitchell ................ B60K 15/04 220/326
4,829,796 A * 5/1989 Kim ................... B60K 15/0409 70/168
5,011,032 A * 4/1991 Rollman ................... A61J 7/04 116/323
5,279,422 A * 1/1994 Adams ....................... A61J 7/04 215/230
5,358,117 A * 10/1994 Adams ....................... A61J 7/04 215/230
5,577,335 A * 11/1996 Tucker ................. A47B 23/044 215/230

(Continued)

*Primary Examiner* — Steven A. Reynolds
*Assistant Examiner* — Prince Pal
(74) *Attorney, Agent, or Firm* — GableGotwals

(57) ABSTRACT

A lid counts a number of patient accesses to a pill bottle. The lid has an actuator, a main housing containing the actuator and an access counter responsive to the actuator. The actuator stores energy in response to axial force manually applied to mount the lid on the bottle and releases the stored energy in response to counter-axial force manually applied to remove the lid from the bottle. Each release of energy causes the access counter to advance one interval, indicating an accumulated total of advances and, therefore, the total number of times the bottle has been accessed. The lid can be adjusted to account for taking various numbers of pills per dosage over a predetermined time period.

3 Claims, 4 Drawing Sheets

(56) References Cited

U.S. PATENT DOCUMENTS

| | | | | |
|---|---|---|---|---|
| 5,638,970 | A * | 6/1997 | Garby | G06M 1/248 215/230 |
| 5,720,392 | A * | 2/1998 | Price | G09F 11/23 215/230 |
| 6,062,420 | A * | 5/2000 | Krouwel | B65D 83/0463 221/88 |
| 6,089,180 | A * | 7/2000 | Nichols, Jr. | G09F 11/23 215/230 |
| 6,843,715 | B2 * | 1/2005 | Munini | B65D 83/0454 453/47 |
| 7,314,022 | B2 * | 1/2008 | Sollaccio | G09F 11/23 215/230 |
| 8,689,988 | B2 * | 4/2014 | Xu | A61J 7/04 215/206 |
| 8,936,157 | B1 * | 1/2015 | Xu | B65D 47/265 220/555 |
| 9,021,981 | B2 * | 5/2015 | Raiti de Boyles | A61J 7/04 116/315 |
| 9,896,249 | B2 * | 2/2018 | Decottignies | B65D 47/249 |
| 10,180,018 | B1 * | 1/2019 | Simpson | A61J 7/0481 |
| 10,198,975 | B2 * | 2/2019 | Nazginov | A61J 7/04 |
| 10,201,479 | B2 * | 2/2019 | Nazginov | A61J 1/1418 |
| 10,213,365 | B1 * | 2/2019 | Sukkarieh | A61J 7/0076 |
| 10,266,317 | B1 * | 4/2019 | Bores | B65D 51/1683 |
| 10,470,976 | B2 * | 11/2019 | Warden | B65D 50/04 |
| 10,792,223 | B1 * | 10/2020 | Lamaster | A61J 1/035 |
| 11,819,473 | B1 * | 11/2023 | Anyomi | A61J 1/1412 |
| 2005/0269237 | A1 * | 12/2005 | Tung | A61J 7/04 206/533 |
| 2006/0180566 | A1 * | 8/2006 | Mataya | A61J 1/1425 215/230 |
| 2007/0056503 | A1 * | 3/2007 | Sollaccio | G09F 11/23 116/308 |
| 2008/0173666 | A1 * | 7/2008 | Coe | B65D 83/0409 221/265 |
| 2010/0212664 | A1 * | 8/2010 | Bishop | A61M 15/007 128/200.23 |
| 2013/0292354 | A1 * | 11/2013 | Xu | A61J 7/04 215/230 |
| 2014/0291279 | A1 * | 10/2014 | Robertos | A61J 1/03 215/365 |
| 2014/0332494 | A1 * | 11/2014 | Balakier | B65D 1/0246 215/365 |
| 2015/0078139 | A1 * | 3/2015 | Raiti de Boyles | A61J 7/04 368/10 |
| 2015/0305984 | A1 * | 10/2015 | Ali | A61J 7/04 116/308 |
| 2016/0031631 | A1 * | 2/2016 | Kim | B65D 47/0861 221/31 |
| 2017/0079886 | A1 * | 3/2017 | Sagynaliev | A61J 1/1418 |
| 2017/0202748 | A1 * | 7/2017 | Gosselin | B65D 41/0478 |
| 2017/0281471 | A1 * | 10/2017 | Hamilton | A61J 7/0076 |
| 2020/0247589 | A1 * | 8/2020 | Mott | A61J 1/1412 |
| 2022/0063883 | A1 * | 3/2022 | Mott | B65D 55/02 |
| 2024/0164992 | A1 * | 5/2024 | Krance | A61J 7/04 |

* cited by examiner

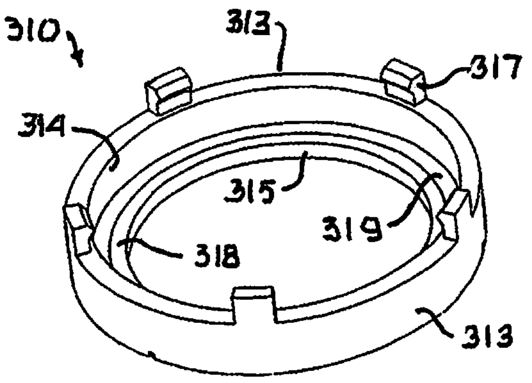
FIG. 11
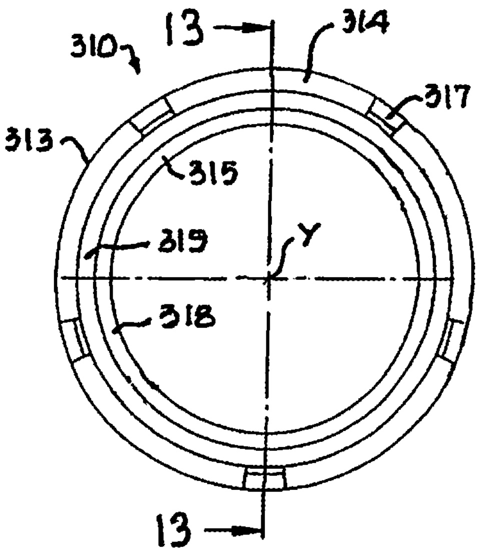
FIG. 12
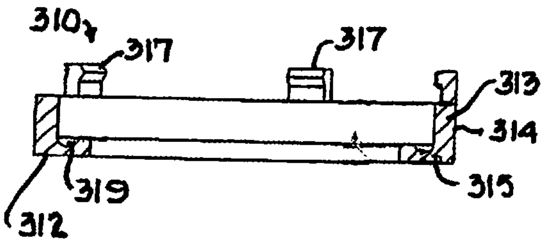
FIG. 13
FIG. 14
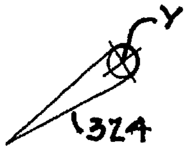
FIG. 15
FIG. 16
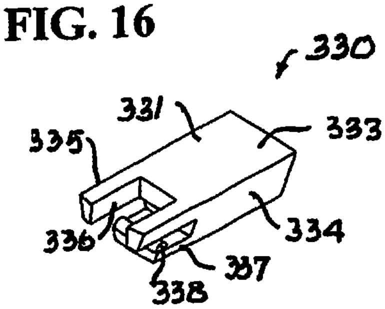
FIG. 17
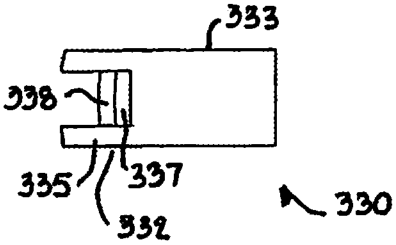
FIG. 18

ACCESS COUNTING LID FOR A PRESCRIPTION PILL BOTTLE

CROSS-REFERENCE TO CO-PENDING APPLICATIONS

The present application is a continuation of, and claims priority to, U.S. application Ser. No. 17/541,573 filed Dec. 3, 2021, which is incorporated herein by reference.

BACKGROUND OF THE INVENTION

This invention relates generally to pill bottles and more particularly concerns the lids used to cover the bottles.

Known pill bottles and lids have complemental structures on their rims which, when engaged, hold the bottles closed and, when disengaged, allow the bottles to be opened. Some are specially designed to make it more difficult to remove the lid from the bottle, typically by requiring use of two different relative motions, one for aligning the complemental structures and another for engaging and disengaging the complemental structures.

Prescription pill bottles typically display a recommended number of pills for each dosage and the daily frequency for the dosages to be taken. However, known pill bottles do not provide information useful in aiding the patient to know whether the prescribed instructions are being followed. They do not advise the patient as to the number of times the contents of the bottle have been accessed. They do not provide information suitable to enable a patient to determine whether a prescribed dosage of pills or tablets has already been taken. They do not provide information suitable to enable the patient to determine whether a prescribed dosage should be taken.

It is, therefore, an object of this invention to provide a pill bottle lid that keeps track of the number of times the pill bottle has been accessed. It is also an object of this invention to provide a pill bottle lid that provides information suitable to enable the patient to determine whether a prescribed dosage has already been taken or should be taken. And it is an object of this invention to provide a pill bottle lid that is capable of advising the patient of a possibly excessive access to its contents.

SUMMARY OF THE INVENTION

In accordance with the invention, a lid is provided for counting a number of patient accesses to a pill bottle. The lid has an actuator, a main housing containing the actuator and an access counter responsive to the actuator. The actuator stores energy in response to axial forces manually applied to mount a bottom rim of the lid on an upper rim of the bottle and releases the stored energy in response to manual removal of the bottom rim of the lid from the upper rim of the bottle. Each release of energy causes the access counter to advance for a predetermined interval to an indicia representative of an accumulated total of the advances.

The main housing has a cover disk and a bottom rim spaced apart by a cylindrical sidewall. Lugs are spaced on, and extend radially inward from, the bottom rim. The actuator has an upper disk abutting a bottom of the cover disk and a lower disk biased by a compression spring away from the upper disk and against the lugs.

Preferably the access counter has an access indicator displaying consecutive indicia. Each consecutive indicia identifies a completion of a consecutive one of the predetermined intervals. The access indicator also has a vertical shaft extending upward to a horizontal pointer that extends radially over the cover disk and advances one consecutive indicia for each cycle of operation of the actuator.

Preferably, the access indicator is a peripheral dial. A stop is mountable on the dial at that indicia indicative of completion of the number of cycles permissible in a predetermined dosage time frame. A lock on the stop prevents rotational advancement of the pointer beyond that indicia.

The main housing bottom rim is adapted to be mounted on and dismounted from the upper rim of the pill bottle by manually applied relative axial and counter-axial motions, respectively. In a first phase of operation initiated in response to the lid being mounted on the pill bottle, energy is stored in the actuator. In a second phase of operation initiated in response to the lid being dismounted from the pill bottle, stored energy is released from the actuator. The access counter is driven by the energy released from the actuator and advances consecutively at predetermined equal intervals to an indicia representative of the accumulated total of the advances.

An actuator for counting a number of patient accesses to a pill bottle has a lower disk with an upward extending spindle and an upper disk with a downward extending spinner housing. A compression spring biases the lower disk away from the upper disk. A spinner is disposed for rotation in axial alignment inside of the spinner housing. A conical spring is axially aligned inside of the spinner housing and biases the spinner way from the upper disk toward an upper end of the spindle.

A base number of vertical formations extend radially outward from the spindle. The same base number of vertical formations extend radially outward from the spinner. Twice the base number of vertical formations extend radially inward from the spinner housing to define vertical grooves in between. The vertical formations of the spindle and the spinner are co-operable with alternate ones of the grooves in the spinner housing to guide relative reciprocal axial motion of the spindle and the spinner in the spinner housing, respectively.

The upper surface of the spindle has twice the base number of downward ramps. Each vertical formation of the spinner housing has a spinner housing ramp at its upper end. Each vertical formation of the spinner has a spinner ramp at its lower end. As the compression spring is compressed, the conical spring is compressed and the spinner is pushed above the spindle housing ramps. As the compression spring expands, the spinner ramps are initially co-operable with alternate ones of the spindle ramps to cause the spinner to rotate about a Y-axis for a first angular interval and subsequently co-operable with alternate ones of the spinner housing ramps to cause the spinner to rotate about said Y-axis for a second angular interval.

BRIEF DESCRIPTION OF THE DRAWINGS

Other objects and advantages of the invention will become apparent upon reading the following detailed description and upon reference to the drawings in which:

FIG. 11 is a perspective view of the peripheral dial of the dosage counting lid of FIG. 1;

FIG. 12 is a bottom plan view of the peripheral dial of FIG. 11;

FIG. 13 is a cross-sectional view taken along the line 13-13 of FIG. 12;

FIG. 14 is a top plan view of the counter hand of the dosage counting lid of FIG. 1;

FIG. 15 is a bottom plan view of the counter hand of FIG. 14;

FIG. 16 is a perspective view of the lock of the dosage counting lid of FIG. 1;

FIG. 17 is a top plan view of the lock of FIG. 16; and

FIG. 18 is an end view of the lock of the dosage counting lid of FIG. 16.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Figure 1:
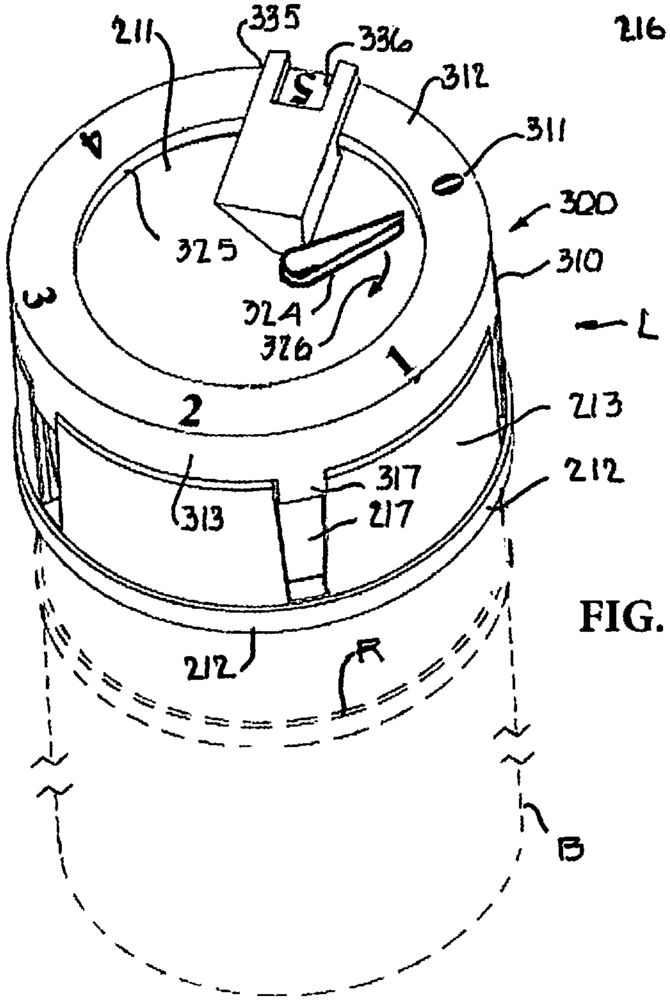
FIG. 1 is a perspective view of a preferred embodiment of a dosage counting lid for a pill bottle.

In accordance with the present invention, and looking at FIG. 1, a lid L is provided that counts and displays the number of pill bottle accesses made by a patient. As used herein, patient includes a patient's caregivers. The lid L takes advantage of the relative manual axial and counter-axial motions necessary to mount the lid L on, and to separate the lid L from, the bottle B, respectively. The bottle B, the rim R and the complemental structures on the lid L and the bottle B are not elements of the present invention. Regardless of the type of complemental structures involved, such as twist, screw, pop or snap type structures, all known pill bottles and lids require the occurrence of relative manual axial and counter-axial motion of the lid and the bottle in order to close and open the bottle.

The Lid

Looking now at FIGS. 1-4, the lid L includes an actuator 100, a main housing 200 containing the actuator 100 and an access counter 300 responsive to the actuator 100. Each time the patient mounts the main housing 200 on the bottle B, the relative axial motion of the rim 212 of the main housing 200 onto the rim R of the bottle B drives the first phase of operation of the actuator 100 in which energy is stored in the actuator 100. Each time the patient counter-axially separates the main housing 200 from the bottle B, the relative counter-axial motion of the rim R of the bottle B out of the rim 212 of the main housing 200 initiates the second phase of operation of the actuator 100 in which stored energy is released by the actuator 100. Each time energy is released by the actuator 100, the access counter 300 is caused to advance for a predetermined angular interval I. The accumulated total of angular interval advances represents the total number of patient accesses to the bottle B. The purpose of the lid L will be compromised if a number of pills other than a prescribed dosage is removed during any access to the bottle B.

The Actuator

Figure 3:
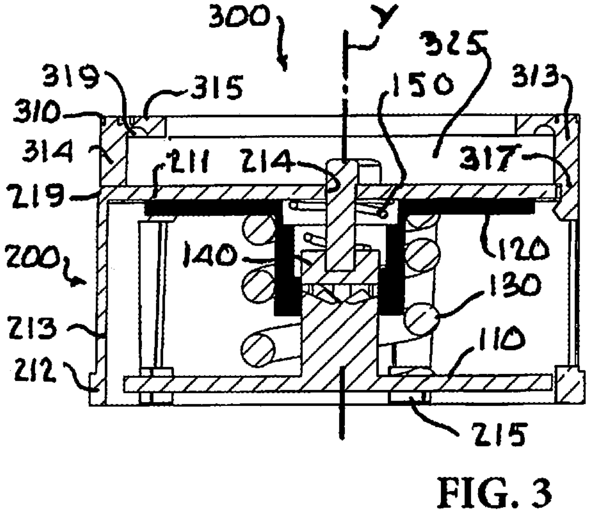
FIG. 3 is a cross-sectional view taken along the line 3-3 of FIG. 2.
Figure 4:
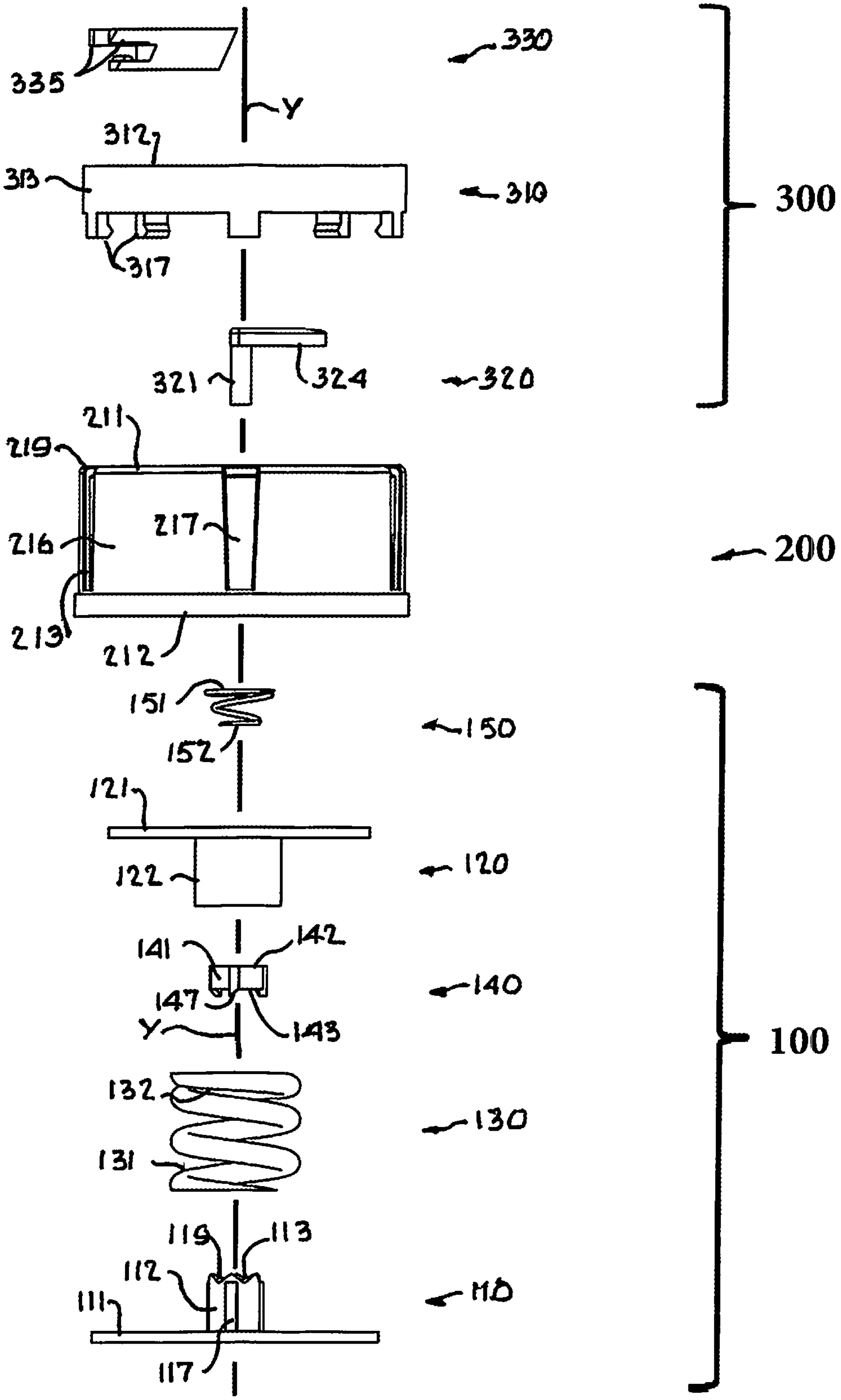
FIG. 4 is an elevation assembly view of the dosage counting lid of FIG. 1.

Focusing on FIGS. 3 and 4, the actuator 100 of the lid L is an arrangement of components generally concentrically aligned on a Y-axis. In the embodiment shown, the actuator includes a driver 110, a spinner housing assembly 120, a compression spring 130, a spinner 140 and a conical spring 150.

Figure 5:
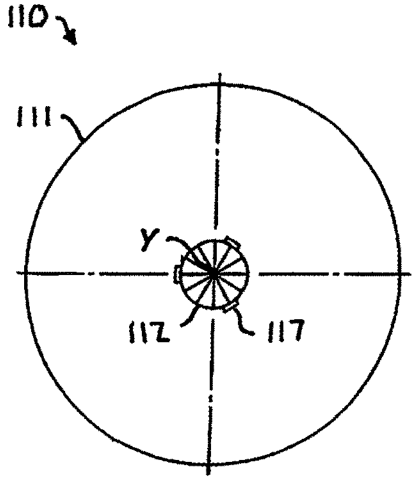
FIG. 5 is a top plan view of the driver of the dosage counting lid of FIG. 1.
Figure 6:
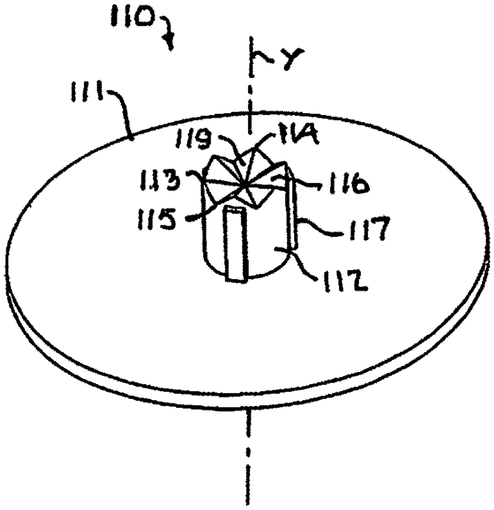
FIG. 6 is a perspective view of the driver of FIG. 5.

Looking at FIGS. 3-4 and 5-6, the driver 110 of the actuator 100 shown has a horizontal drive disk 111 with a concentric upward extending spindle 112. As best seen in FIGS. 5 and 6, the top face of the spindle 112 has six identical pyramidic formations 113. The apices 114 of the formations 113 define a common upper horizontal plane and the radial nadirs 115 define a lower horizontal plane. The walls between the apices 114 and nadirs 115 provide alternating upward and downward spindle ramps 116 and 119. The cylindrical side wall of the spindle 112 has three identical, equally spaced formations 117 of rectangular cross-section extending vertically from the drive disk 111 to the plane of the nadirs 115 of the pyramidic formations 113. As shown, the three vertical formations 117 are aligned beneath the apices 114 of alternate pyramidic formations 113.

Figure 7:
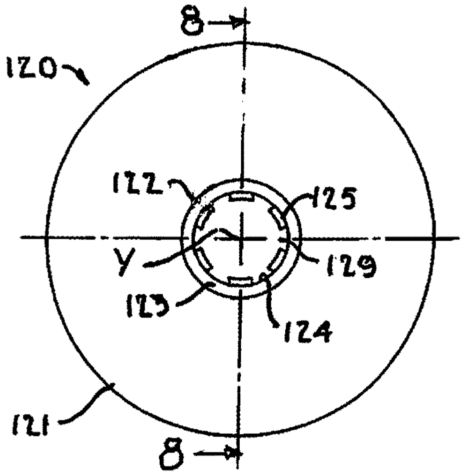
FIG. 7 is a top plan view of the spinner housing assembly of the dosage counting lid of FIG. 1.
Figure 8:
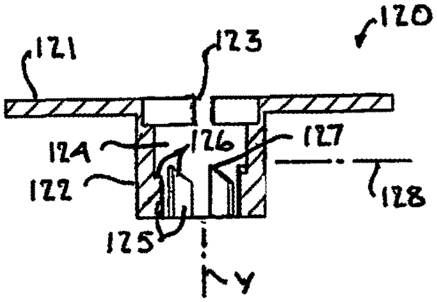
FIG. 8 is a cross-sectional view taken along the line 8-8 of FIG. 7.

Looking now at FIGS. 3-4 and 7-8, the spinner housing assembly 120 of the actuator 100 shown includes a horizontal upper disk 121 and a concentric downward extending spinner housing 122. As best seen in FIGS. 7 and 8, the upper disk 121 has a concentric cylindrical opening 123 that extends slightly below the upper disk 121 into the side wall of the spinner housing 122. A narrower concentric cylindrical passage 124 extends from the opening 123 through the bottom of the spinner housing 122.

Six equally spaced identical vertical formations 125 of rectangular cross-section extend radially from the inside wall of the spinner housing 122 into the passage 124. As best seen in FIG. 8, the bottom faces of the vertical formations 125 are flush with the bottom face of the housing 122. Also as best seen in FIG. 8, the top faces of the formations 125 are angled in the circumferential direction to provide six spinner housing ramps 126. The spinner housing ramps 126 are each in planes parallel to the planes of the downward spindle ramps 119. The upper tips 127 of the housing ramps 126 define a horizontal plane 128 through the cylindrical passage 124. If the bottom of the spinner 140 drops below the horizontal plane 128, the vertical formations 125 in the spinner housing 122 function as obstructions to rotation of the spinner 140 in the passage 124. If the bottom of the spinner 140 rises above the plane 128, the spinner 140 is free to rotate in the passage 124.

Again focusing on FIGS. 3 and 4, the compression spring 130 of the actuator 100 shown biases the drive disk 111 of the driver 110 away from the upper disk 121 of the spinner housing assembly 120. The lower end portion 131 of the compression spring 130 abuts the top face of the drive disk 111 and surrounds the spindle 112. The upper end portion 132 of the compression spring 130 abuts the bottom face 123 of the upper disk 121 of the spinner housing assembly 120 and grips around the spinner housing 122.

Figure 10:
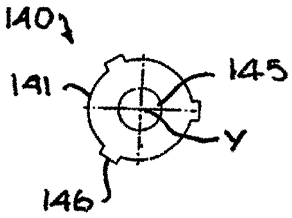
FIG. 10 is a top plan view of the spinner of FIG. 9.
Figure 9:
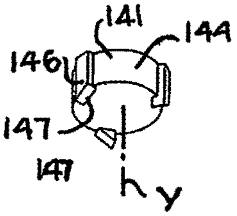
FIG. 9 is a perspective view of the spinner of the dosage counting lid of FIG. 1.

Now considering FIGS. 3-4 and 9-10, the spinner 140 of the actuator 100 shown has a solid body 141 with a top face 142, a bottom face 143 and a cylindrical side wall 144. As best seen in FIGS. 3 and 10, a socket 145 is centered on the spinner body top face 142 and extends downward into the body 141 of the spinner 140. As shown, there are three identical vertical formations 146 of rectangular cross section equally spaced on and extending outward from the side wall 144 of the spinner 140.

Once again focusing on FIGS. 3 and 4, the conical spring 150 of the actuator 100 shown has a top coil 151 wider than its bottom coil 152 and is axially aligned inside of the spinner housing 122 between the upper disk 121 and the spinner 140. The bottom coil 152 abuts the top face 142 of the spinner 140. The conical spring 150 biases the spinner 140 toward the top face of the spindle 112.

The Main Housing

The main housing 200 of the lid L is seen in FIGS. 1-4. In the embodiment shown, the main housing 200 includes a cover disk 211, the bottom rim 212 and a cylindrical sidewall 213. The cover disk 211 has a central aperture 214. The bottom rim 212 has a plurality of lugs 215, as shown five, equally spaced on and extending radially inward from the bottom rim 212. Downward axial motion of the drive disk 111 is stopped at and by the lugs 215. The upper disk 121 of the spinner housing assembly 120 is fixed against the bottom face 218 of the cover disk 211 of the main housing 200. Therefore, upward axial motion of the drive disk 111 is resisted by the biasing force of the compression spring 130. The cylindrical sidewall 213 of the main housing 200 is divided into panels 216 by slots 217 extending between the cover disk 211 and the bottom rim 212.

The Access Indicator

The access indicator 300 of the lid L is seen in FIGS. 1-4 and 11-18. In the embodiment shown, the access indicator 300 includes a peripheral dial 310, a pointer assembly 320 and a lock 330.

Figure 2:
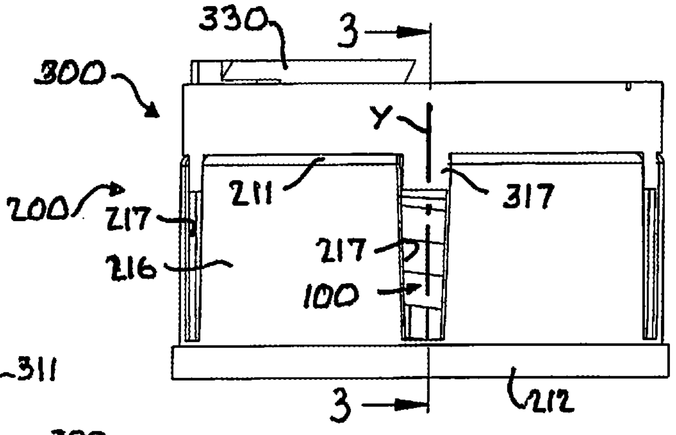
FIG. 2 is an elevation view of the dosage counting lid of FIG. 1.

As best seen in FIGS. 1-3, the peripheral dial 310 is mounted atop the cover disk 211 of the main housing 200 and displays indicia 311 representative of consecutive predetermined angular intervals I equally-spaced on the dial 310. In the embodiment shown the indicia 311 intervals displayed are 0, 1, 2, 3, 4 and 5. Preferably, and as shown, the indicia 311 are etched into the top surface 312 of the dial 310.

Looking at FIGS. 1-4 and 11-13, a preferred embodiment of the dial 310 is configured as an outer ring 313 of L-shaped cross-section. The vertical leg 314 of the ring 313 rests on, and spaces the horizontal leg 315 above, the outer perimeter 219 of the cover disk 211 of the main housing 200. The bottom face 318 of the horizontal leg 315 also has an annular groove 319. The vertical leg 314 has a plurality of equally-spaced depending clips 317, as shown five. As best seen in FIG. 3, each clip 317 wraps around the edge of the cover disk 211 of the main housing 200, passes through its respective slot 217 in the main housing 200 and engages against the bottom edge of the cover disk 211 of the main housing 200.

Now looking at FIGS. 1-4 and 14-15, a preferred embodiment of the pointer assembly 320 includes a vertical shaft 321 and a horizontal pointer 324. The bottom end 322 of the shaft 321 is fixed to the spinner 150, preferably press-fitted into the socket 145 in the top of the spinner 140, for axial rotation with the spinner 140. The shaft 321 extends upward through the cylindrical passage 124 of the spinner housing 122 and through the central aperture 214 of the cover disk 211 of the main housing 200. As best seen in FIG. 3, the upper end 323 of the shaft 321 extends above the central aperture 214 into the horizontal space 325 defined by the peripheral dial 310. The horizontal pointer 324 radially extends from the upper end 323 of the vertical shaft 321 across the main housing cover disk 211 but below the level of the horizontal leg 315 of the peripheral dial 310. The pointer 324 rotates with the shaft 321, in the clockwise direction as shown in FIG. 1, and is sequentially directed at the indicia 311 on the dial 310, advancing one indicia 311 for each completed operation cycle of the actuator 100.

Looking at FIGS. 1-4, 14 and 16-18, a preferred embodiment of the lock 330 has a body 331 of generally trapezoidal cross-section. One end portion 332 of the body 331 is configured for connection to the peripheral dial 310 and the other end portion 333 is configured to present a stop 334 to the pointer assembly 320. As shown, the connection end portion 332 of the lock body 331 has two upper spaced-apart arms 335 extended to rest on the top surface 312 of the peripheral rim 310 and to define a window 336 to display a selected one of the indicia 311 on the rim 310.

The connecting portion 332 of the lock body 331 also has a lower tongue 337 extending parallel to the arms 335. A bead 338 extends along the top of the tip of the tongue 337. The bead 338 is configured to engage in the annular groove 319 on the bottom face 318 of the horizontal leg 315 of the preferred embodiment of the dial 310 with the arms 335 resting on the top surface 312 of the dial 310. When engaged to display a selected one of the indicia 311, the body 331 of the lock 330 is cantilevered toward the center of the peripheral dial 310 and presents an angled face 339 that urges the pointer 324 downward against the upper cover disk 211 of the main housing 200, preventing any further rotation of the shaft 321 and advancement of the pointer 324.

Actuator Automatic Operation

Looking at FIG. 3, with the lid L completely detached from the bottle B, the actuator 100 is in a normal condition. In this condition the compression spring 130 holds the actuator drive disk 111 in abutment against the lugs 215 of the main housing 200. The conical spring 150 is in an unloaded state and the vertical spindle formations 117 and vertical spinner formations 146 are engaged in the vertical spinner housing grooves 129.

Looking at FIGS. 3-10, the first, or bottle closing, phase of the operational cycle of the actuator 100 is carried out as the patient closes the bottle B by axial engaging motion of the bottom rim 212 of the main housing 200 onto the top rim R of the bottle B. In any design, the manually induced axial motion of the rim R of the bottle B causes the top edge of the bottle B to push the drive disk 111 of the driver 110 against the bias of the compression spring 130 and away from the lugs 215 on the bottom rim 212 of the main housing 200. During the axial motion of the drive disk 111 away from the lugs 215, the three vertical formations 117 on the sidewall 118 of the spindle 112 (FIGS. 5 and 6) cooperate with alternate ones of the six vertical grooves 129 inside of the spinner housing 122 to guide the spindle 112 inside of the spinner housing 122 (FIGS. 7 and 8) and limit the driver 110 and the spinner housing 122 to relative axial motion only.

As the axial motion of the drive disk 111 compresses the compression spring 130, the apices 114 of the spindle ramps 116 and 119 rise toward contact with respective spinner ramps 147. At initial contact, the apices 114 are positioned in the middle of the spinner ramps 147. As the spindle apices 114 push up on the ramps 147 of the spinner 140, the spinner 140 rises in the spinner housing 122 and the conical spring 150 is being compressed.

Once the spinner 140 is pushed above the plane 128 defined by the tips 127 of the spindle housing ramps 126, the spinner 140 is released from the control of the vertical spinner housing formations 125. When the conical spring 150 has been fully compressed between the spinner 140 and the main housing cover disk 211, the first, or bottle closing, phase of the operating cycle of the actuator 100 is completed and the energy necessary for the next phase of the actuator operating cycle has been stored in the conical spring 150 of the actuator 100.

The second phase of the operational cycle of the actuator 100 will be carried out as the patient opens the bottle B by counter-axial motion of the bottom rim 212 of the main housing 200 off of the rim R of the bottle B. In any design, the counter-axial action releases the compression spring 130 to expand, driving the driver drive disk 111 back toward the lugs 215 on the bottom rim 212 of the main housing 200.

As the compression spring 130 expands, the conical spring 150 also expands, driving the three spinner ramps 147 downward into abutment with the three respective alternate downward spindle ramps 119. Since the spinner 140 is free to rotate, and since the spindle 112 has six downward ramps 119, the force applied by the conical spring 150 turns the spinner 140 substantially thirty degrees.

As the conical spring 150 continues to expand, the three spinner ramps 147 are driven into abutment with alternate spinner housing ramps 126. The force applied by the expanding conical spring 150 then causes the spinner and spinner housing ramps 147 and 126 slide against each other, rotating the spinner 140 substantially another 30 degrees.

Once the spinner ramps 147 have crossed their respective spinner housing ramps 126, the spinner 140 sets down firmly in the spinner housing grooves 129. The driver drive disk 111 is biased by the compression spring 130 against the lugs 215 on the bottom rim 212 of the main housing 200 and the driver spindle 112 no longer supports the spinner 140. This completes the second, or bottle opening, phase of the operational cycle of the actuator 100 and leaves the actuator 100 in its normal condition.

In one full operational cycle of the actuator 100 shown, the spinner 140 is rotated about the Y-axis for a total of sixty degrees in two thirty degree steps. The 60 degree advance occurs during the second, or opening, phase of operation. This advances the pointer 324 of the access counter 300 one interval I on the peripheral dial 310 of the lid L to the next sequential indicia 311 on the peripheral dial 310 of the access indicator 300.

In the embodiment shown, the actuator 100 is capable of six each sixty degree intervals I over six complete cycles of the actuator 100. The spindle 112 has six pyramidic formations 113, each with a downward spindle ramp 119, and three vertical formations 117. The spinner housing 122 has six vertical formations 125, each with a spinner housing ramp 126. The spinner 140 has three vertical formations 146, each with a spinner ramp 147. Thus, the formations controlling the operation of the actuator 100 demonstrate a 6 to 3, or 2 to 1 ratio, providing a six each sixty degree interval access indicator 300.

However, and for example, using the same principles, an embodiment capable of eight each forty-five degree intervals I over eight complete cycles of the actuator 100 are proportionally possible if the formations and ramps are employed according to an 8 to 4, or 2 to 1, ratio. Any even ratio can be applied as long as the intervals I provide sufficient space for each of the indicia 311 of the access indicator 300 to be discernable by the patient.

Lid Patient's Operational Actions

Actions A-D below prepare the lid L to be used for its intended purpose of counting accesses to the dosages in the bottle B. Actions C-D can be performed in reverse order. Actions E-F below describe a single access cycle in the operation of the actuator 100 of the lid L. Actions G-H below describe use of the lid L until the contents of the bottle B are exhausted or the prescription is expired, whichever is first to occur.

A. With the lid L detached from the bottle B, confirm that the bottle B contains at least the maximum number of pill dosages to be dispensed during a selected pill distribution time period (e.g., daily or weekly or other) displayed in the window 336 through the lock 330. The actuator 100 is in its normal condition.

B. Axially engage the rim 212 of the main housing 200 over the rim R of the bottle B to close the bottle B.

C. Mount the lock 330 on the peripheral dial 310 with the window 336 of the lock 320 displaying the interval number I representative of the total permissible accesses to the bottle B during the selected pill distribution time period.

D. Rotate the pointer assembly 320 to point the pointer 324 at the zero indicia 311 on the peripheral dial 310. This can be accomplished with the patient's thumbs while the lid L is off the bottle B, by pressing up and down on the lid L while it is on the bottle B or by pressing and holding the lid L down while manually rotating the pointer 324 clockwise.

E. Counter-axially separate the lid L and the bottle B to permit an access to the contents of the bottle B. The actuator 100 will automatically return to its normal condition.

F. Take one dosage of pills out of the bottle B.

G. Repeat actions B and D-F until the pointer 324 strikes the stop 334 on the lock 330.

H. Repeat actions B and D-G until the prescription is no longer in use.

The structure of the rim 212 of the main housing 200 of the lid L will be configured to complement the structure on the rim R of the selected pill bottle B.

For bottles requiring use of different relative motions, one for alignment and another for disengagement, of the complemental structures, action B will include the appropriate alignment of the complemental structures.

A prototype of the actuator 100 was made for use with a prescription bottle having a 1.5" outer diameter. The driver 110 had a drive disk 111 that was 1.65" in diameter and 0.06" thick. The spindle 112 was 0.3" in diameter and 0.34" high to the apices 114 of its pyramidic formations 113. The spindle vertical formations 117 were 0.29" high×0.07" wide×0.02" thick. The spinner housing assembly 120 had an upper disk 121 that was 1.5" in diameter and 0.06" thick. The spinner housing 122 was 0.5" in outer diameter and 0.39" high. The spinner housing vertical formations 125 were 0.21" high on the long side, 0.15" high on the short side and 0.7" wide×0.1" thick. The compression spring 130 was 0.675" long and had a 0.5" inner diameter and a comfortable spring rate. The spinner 140 had a body 141 that was 0.13" high with a 0.29" diameter. The spinner vertical formations 146 were 0.3" long to the tips of the ramps 147×0.055" wide×0.023" thick. The conical spring 150 was 0.02" long with a 0.42" outer diameter top coil 151 and a 0.16" inner diameter bottom coil 152. This dimensional set was operable for a 1.5" outer diameter prescription bottle.

Thus, it is apparent that there is been provided, in accordance with the invention, an access counting lid for a pill bottle that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit of the appended claims.

What is claimed is:

1. A lid for counting a number of patient accesses to a pill bottle, the lid comprising an actuator, a main housing containing said actuator and an access counter responsive to said actuator, said actuator storing energy in response to axial forces manually applied to mount a bottom rim of the lid on an upper rim of the bottle and releasing said stored energy in response to manual removal of the bottom rim of the lid from the upper rim of the bottle, said access counter having a horizontal radial pointer and consecutive indicia, one said consecutive indicia for each cycle of operation of said actuator, said released energy causing said access counter to advance said horizontal radial pointer for a predetermined interval to an indicia representative of an accumulated total of said advances.

2. The lid according to claim 1:

said main housing comprising a cover disk and a bottom rim spaced apart by a cylindrical sidewall, said bottom rim having lugs spaced thereon and extending radially inward therefrom; and said actuator having an upper disk abutting a bottom of said cover disk and a lower disk biased by a compression spring away from said upper disk and against said lugs.

3. A lid for counting a number of patient accesses to a pill bottle, the lid comprising:

an actuator, said actuator in a first phase of operation being compressed to store energy therein and in a second phase of operation being permitted to expand, releasing energy stored therein;

an access counter having a horizontal radial pointer and consecutive indicia, one said consecutive indicia for each cycle of operation of said actuator, said access counter advancing said horizontal radial pointer one said consecutive indicia for each cycle of operation of said actuator;

a stop mountable at a selected one of said indicia, said stop distinguishing completion of a number of cycles permitted in a predetermined dosage time frame;

and a lock on said stop preventing rotational advancement of said pointer beyond said selected one of said interval indicia.

* * * * *